United States Patent
Kubota et al.

(10) Patent No.: US 7,429,825 B2
(45) Date of Patent: Sep. 30, 2008

(54) HEADLIGHT BEAM CONTROL SYSTEM AND HEADLIGHT BEAM CONTROL METHOD

(75) Inventors: Tomoki Kubota, Okazaki (JP); Hidefumi Okabe, Aichi (JP)

(73) Assignee: Aisin A W Co., Ltd. (JP)

( * ) Notice: Subject to any disclaimer, the term of this patent is extended or adjusted under 35 U.S.C. 154(b) by 373 days.

(21) Appl. No.: 11/438,293

(22) Filed: May 23, 2006

(65) Prior Publication Data
US 2006/0267502 A1 Nov. 30, 2006

(30) Foreign Application Priority Data
May 24, 2005 (JP) .............................. 2005-151055

(51) Int. Cl.
*B60Q 1/02* (2006.01)
(52) U.S. Cl. .......................... 315/82; 315/77; 307/10.1
(58) Field of Classification Search .................. 315/76, 315/77, 82; 307/10.1, 10.8
See application file for complete search history.

(56) References Cited

U.S. PATENT DOCUMENTS 6,097,023 A * 8/2000 Schofield et al. ......... 250/208.1
6,559,435 B2 * 5/2003 Schofield et al. ......... 250/208.1
6,653,614 B2 * 11/2003 Stam et al. ............... 250/208.1

FOREIGN PATENT DOCUMENTS

JP 06-084099 3/1994

* cited by examiner

*Primary Examiner*—Douglas W. Owens
*Assistant Examiner*—Jimmy T Vu
(74) *Attorney, Agent, or Firm*—Bacon & Thomas, PLLC

(57) ABSTRACT

A headlight beam control system includes an image taking apparatus for capturing an image to the rear of the user's vehicle and for generating image data from the captured image, a following vehicle information acquisition unit for acquiring following vehicle information from the image data, a passing action prediction unit for predicting a passing action based on the following vehicle information, a mode switching condition judgment unit for judging whether a mode switching condition is satisfied, based on the predicted passing action, and an automatic mode setting unit for switching the headlights between a high beam mode and a low beam mode when the mode switching condition is satisfied. When passing of the user's vehicle is predicted based on the following vehicle information, the headlights are switched from the high beam mode to the low beam mode.

4 Claims, 3 Drawing Sheets

HEADLIGHT BEAM CONTROL SYSTEM AND HEADLIGHT BEAM CONTROL METHOD

INCORPORATION BY REFERENCE

The disclosure of Japanese Patent Application No. 2005-151055 filed on May 24, 2005, including the specification, drawings and abstract thereof, is incorporated herein by reference in its entirety.

BACKGROUND OF THE INVENTION

1. Field of the Invention

The present invention relates to a headlight beam control system and a headlight beam control method.

2. Description of the Related Art

A conventional navigation apparatus detects the current position of a vehicle using a GPS (Global Positioning System) sensor and determines the direction of the vehicle based on the angle of traverse of the vehicle as detected by a gyroscopic sensor. Map data is read from a data storage unit, and a map screen is shown on a display unit of the navigation apparatus. A map of an area including the current position of the vehicle is displayed on the map screen, and a mark is displayed on the map to indicate the current position and direction of the vehicle. A driver is thereby assisted in driving his/her vehicle in accordance with the current position and direction of the vehicle displayed on the map.

When the driver inputs a destination and specifies a search condition, the map data is searched in accordance with the specified search condition to find a route from the current position to the destination. If a route is found, it is displayed on the map screen together with the map indicating the position of the vehicle, and route guidance along the found route is provided. Thus, the driver is able to follow the displayed route.

When a vehicle is driven at nighttime, if there is a leading vehicle running ahead of the first vehicle, high beam headlights of the first vehicle can influence driving of the leading vehicle. To avoid such a problem, it is known to provide a headlight beam control system to control the headlight beams by adjusting the optical axes of the headlights in accordance with the distance between the first vehicle and leading vehicle. See for example, Japanese Unexamined Patent Application Publication (Kokai) No. 6-84099.

In the conventional headlight beam control system, an image of a leading vehicle is taken using a front view camera, the leading vehicle is recognized based on image data generated from the captured image, and the headlight beams are controlled by adjusting the optical axes of the headlights in accordance with the distance to the recognized leading vehicle.

Therefore, in a case where a vehicle passes the user's vehicle, the passing vehicle is recognized as a leading vehicle only after the passing vehicle reaches a position in front of the user's vehicle. This delay in controlling the headlight beams is undesirable.

SUMMARY OF THE INVENTION

Accordingly, an object of the present invention is to solve the problem of the delay in operation of a conventional headlight beam control system in response to a passing vehicle.

To achieve the above object, the present invention provides a headlight beam control system including an image taking apparatus which takes an image to the rear of the user's vehicle and generates image data from the captured image, following vehicle information acquisition means for reading the image data and for acquiring following vehicle information from the image data, passing prediction means for predicting an attempt to pass the user's vehicle by a passing vehicle following the user's vehicle, based on the following vehicle information, headlight mode switching condition judgment means for judging whether a headlight mode switching condition is satisfied, based on the predicted attempt to pass, and automatic headlight mode setting means for switching the headlight mode from a high beam mode to a low beam mode when the headlight mode switching condition is satisfied.

In the present invention, an attempt to pass is predicted from the following vehicle information, and the headlights are switched from the high beam mode to the low beam mode in response to prediction of an attempt to pass. This makes it possible to start the control of the headlight mode at a correct time without the aforementioned delay.

DESCRIPTION OF THE PREFERRED EMBODIMENTS

Preferred embodiments of the present invention are described below with reference to the accompanying drawings.

Figure 1:
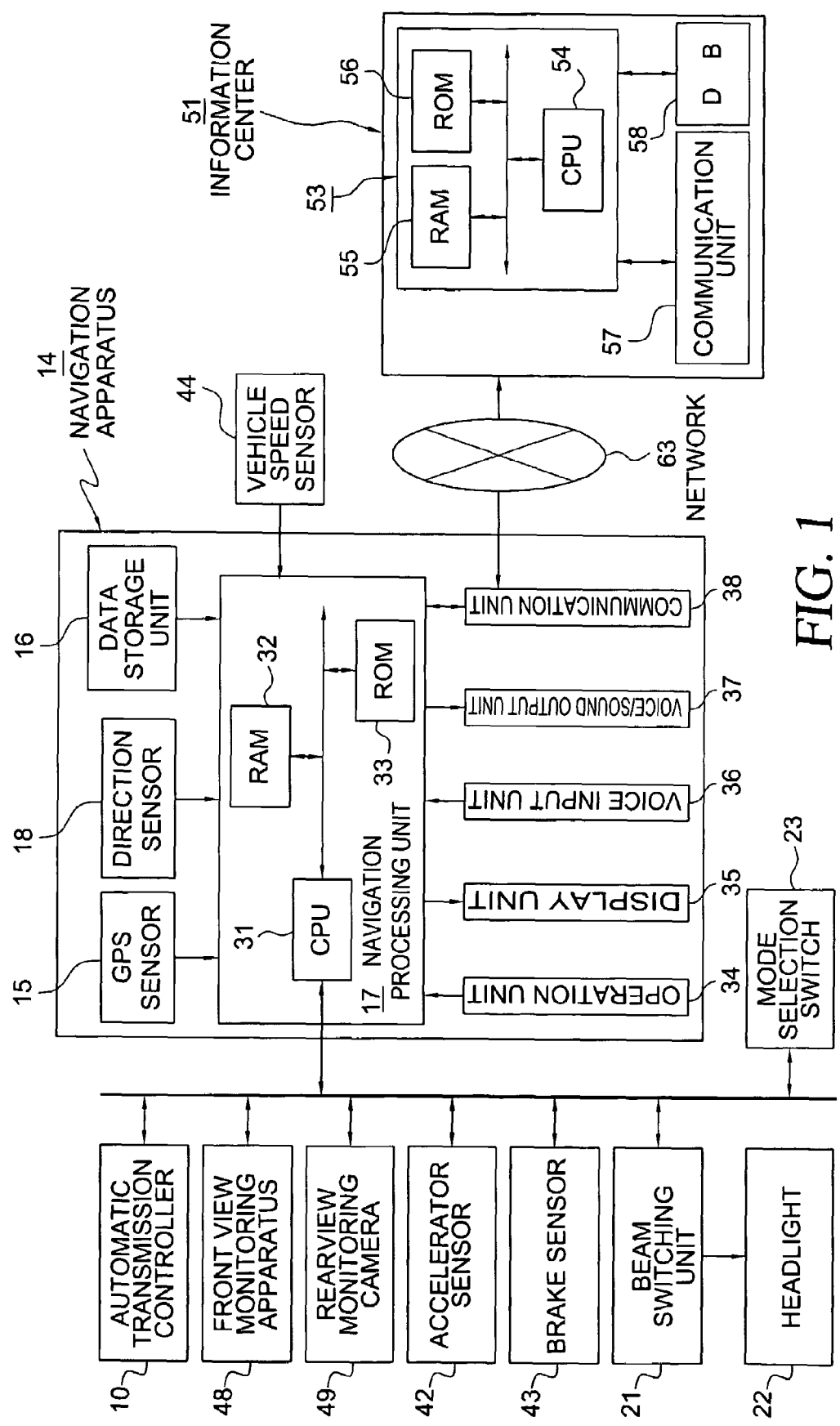
FIG. 1 is a block diagram showing a navigation system according to an embodiment of the present invention.
Figure 2:
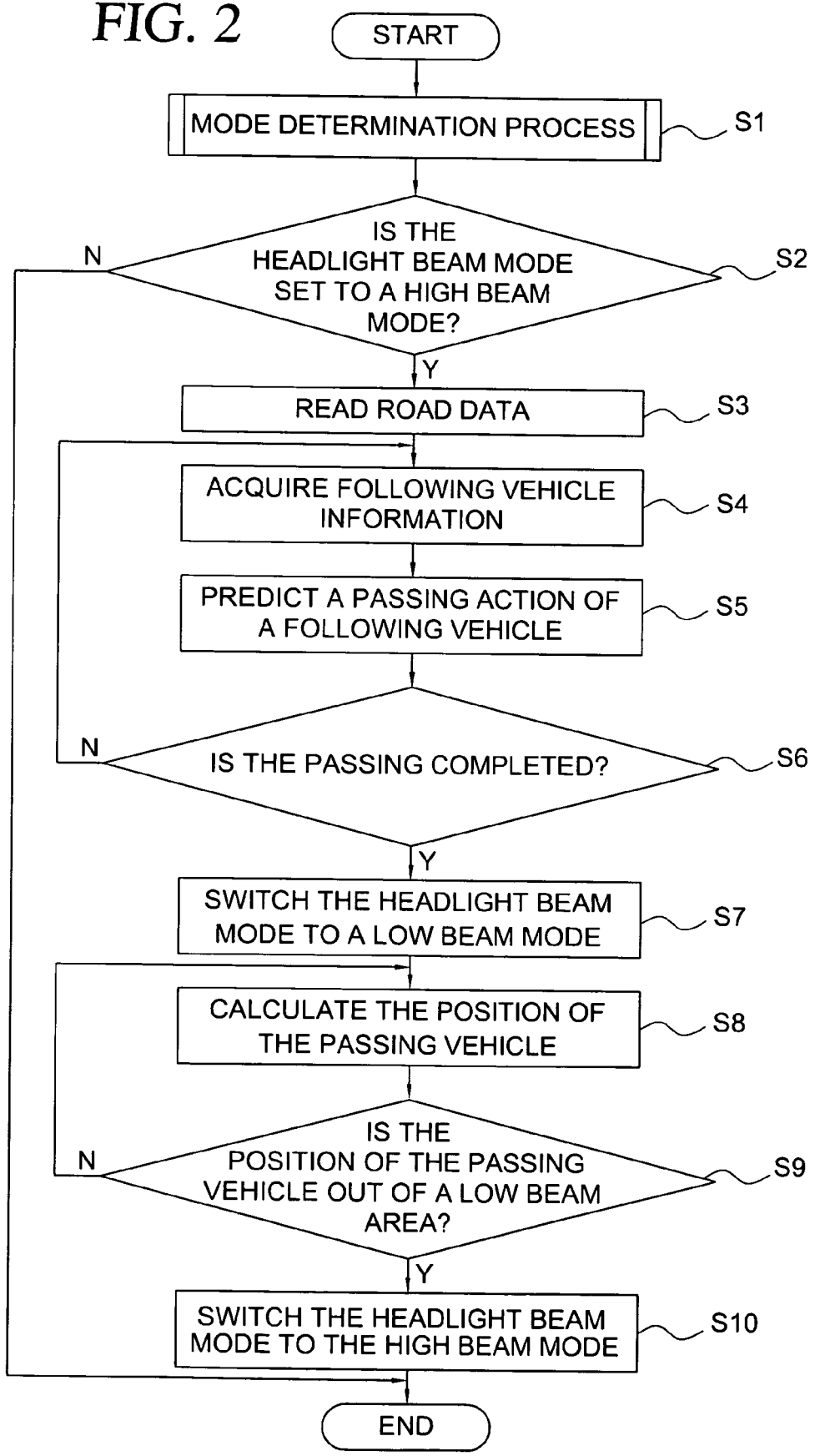
FIG. 2 is a flow chart of a process for operation of a headlight beam control system according to an embodiment of the present invention.

FIG. 1 is a block diagram showing a navigation system according to an embodiment of the present invention.

FIG. 1, shows an automatic transmission controller, i.e. a power train controller, connected to an automatic transmission (not shown) for controlling the automatic transmission.

An on-board information terminal 14, e.g. navigation apparatus, is connected to an information center 51 (an information provider) via a network 63. Thus, the navigation system includes the automatic transmission controller 10, the navigation apparatus 14, the network 63, and the information center 51.

The navigation apparatus 14 includes a GPS sensor 15 serving as a current position detector for detecting the current position of the user's vehicle, a data storage unit 16 in which map data and other various kinds of information are stored, a navigation processing unit 17 for executing various routines, including navigation processing, in accordance with input information, a direction sensor 18 for detecting the direction of the user's vehicle, an operation unit 34 serving as a first input unit used by a driver (operator of the navigation apparatus 14), to input a command or data, a display unit 35 serving as a first output unit for providing information to the driver by displaying the information in the form of an image on a screen (not shown), a voice input unit 36 serving as a second input unit for inputting a command or data via voice, a voice/sound output unit 37 serving as a second output unit for providing information to the driver via voice, and a communication unit 38 serving as a transmitting and receiving unit which functions as a communication terminal. The GPS sensor 15, the data storage unit 16, the direction sensor 18, the operation unit 34, the display unit 35, the voice input unit 36, the voice/sound output unit 37, and the communication unit 38 are connected to the navigation processing unit 17.

The navigation processing unit 17 is connected to the automatic transmission controller 10, to a beam switching unit 21 for switching the beam direction of the headlights 22, a mode selection switch 23 for switching the headlight mode between a manual high beam mode, a manual low beam mode, and an automatic beam control mode, a front view monitoring apparatus 48, disposed at a proper location on the front end of the vehicle for monitoring the view in front of the vehicle, a rearview monitoring camera 49, serving as an "Image taking apparatus", disposed at a proper location on the rear of the vehicle for imaging the vicinity to the rear of the vehicle and for generating image data from the captured image, an accelerator sensor 42 serving as an engine load detector for detecting operation of an accelerator pedal by the driver by, e.g. the degree of depression of the accelerator pedal, a brake sensor 43 serving as a brake detector for detecting operation of the brake pedal by the driver, e.g. by detecting the degree of depression of the brake pedal, and a vehicle speed sensor 44 serving as a vehicle speed detector for detecting the vehicle speed. The "vehicle operation detector" is a combination including the accelerator sensor 42 and the brake sensor 43.

In the automatic beam control mode, the headlight mode is automatically switched between the high beam mode and the low beam mode depending on whether or not a mode switching condition is satisfied. On the other hand, when the headlight mode is set to either the manual high beam mode or the manual low beam mode, the current headlight mode is not switched unless the driver operates the mode selection switch 23.

The GPS sensor 15 receives radio transmissions (signals) from artificial satellites and detects the current position from the received radio transmissions. The GPS sensor 15 also detects the time from the received radio transmissions. Although in the present embodiment the GPS sensor 15 is used as the current position detector, one of or a combination of a distance sensor, a steering sensor, an altimeter (not shown) may be used instead of the GPS sensor 15. Although in the present embodiment the direction sensor 18 is used as the direction detector, a gyroscopic sensor, a geomagnetic sensor, or the like may be used instead of the direction sensor 18.

The data storage unit 16 includes a map database in which map data is stored in the form of map data files. The map data includes intersection data associated with intersections, node data associated with nodes, road data associated with road links, search data for use in searching, facility data associated with facilities, and feature data associated with features. The feature data includes data indicating painted lines on roads such as stop lines and lane lines, data indicating positions of manholes in the roads, traffic markings on the roads, and traffic signals, and image information related thereto. The road data includes data associated with lanes, such as data indicating lane numbers assigned to respective lanes of each road and data indicating positions of the lanes. The data storage unit 16 also stores data used by the voice/sound output unit 37 to output information.

The data storage unit 16 includes a statistic database in the form of a statistical data file, and a travel history database in the form of a travel history data file wherein statistical data and travel history data are respectively stored.

The statistical data is historical data for traffic conditions in the past, obtained by statistical processing of one or a combination of the following: historical (past) traffic data provided by an information provider such as VICS (Vehicle Information and Communication System (registered trademark)); traffic volume data from, for example, a road traffic census provided by the Ministry of Land, Infrastructure and Transport (hereinafter, referred to simply as road traffic census data); and a road time table provided by, for example, the Ministry of Land, Infrastructure and Transport. The statistical data may further include traffic congestion prediction information for predicting traffic congestion. In this case, when the statistical data is produced, data indicating detailed conditions such as dates, times, weather, various events, seasons, facilities (such as department stores, supermarkets, etc.) and so on are added to the history data.

Items of data included in the statistical data are a link number for each road link, a direction flag indicating a running direction, data type indicating the type of data, traffic congestion degree indicating the degree of traffic congestion in each time zone, link times required to travel each road link in each time zone or day, and average link time required to travel each road link on each day of the week.

The travel history data is data collected by the information center 51 from a plurality of vehicles (including the user's vehicle and other vehicles) in previous actual travel of the vehicles. The travel history data is calculated as probe data from running data and is accumulated.

The travel history data includes link time data indicating time spent in travel of each road link in each time zone or day, and degree of traffic congestion data indicating the degree of traffic congestion encountered on each road link in each time zone. The statistical data may further include travel history data. In the present embodiment, the degree of traffic congestion is a measure of the traffic congestion and is expressed as one of three levels: highly congested, congested, and not congested.

The data storage unit 16 may be a disk such as a hard disk, a CD, a DVD, or an optical disk for storing the various items of data described above and also includes a read/write head (not shown) for reading/writing data. A memory card or the like may also be used as the data storage unit 16.

Although in the present embodiment of the invention, the map database, the statistical database, and the travel history database are stored in the data storage unit 16, alternatively, these databases may be stored in the information center 51.

The navigation processing unit 17 includes a CPU 31 which serves as a calculation-and-control unit for control of the entire navigation apparatus 14, a RAM 32 used by the CPU 31 as a working memory in various calculations and/or control operations, a ROM 33 in which a control program, a route search program for searching for a route to a destination, a route guidance program for providing navigation guidance along the determined route, and various other kinds of programs are stored, and a flash memory (not shown) for storing various kinds of data and programs.

Although, as described above, in the present embodiment, various kinds of programs are stored in the ROM 33 and various kinds of data are stored in the data storage unit 16, programs and/or data may be stored on a disk or the like. In this latter case, programs or data may be read from the disk or the like and stored in the flash memory. This makes it possible to update the program and/or data by exchanging disks. The control program and associated data used by the automatic transmission controller 10 may also be stored on the disk. In another alternative, programs or data may be received via the communication unit 38 and stored in the flash memory of the navigation processing unit 17.

The operation unit 34 is used by a driver to correct the current position when driving is started, and to input a starting point, a destination, and/or a point en route. The operation unit 34 is also used to control the communication unit 38. The operation unit 34 may be a keyboard, a mouse, or a similar device disposed separately from the display unit 35. Alternatively, the operation unit 34 may be a touch panel which allows input of a command or data by touching or clicking one of a plurality of keys, switches, or buttons in the form of images displayed on a screen of the display unit 35.

The display unit 35 displays various information such as a mark indicating the current position and the direction of the vehicle of the user, a map, the route determined by the searching process, guidance information for guidance along the route, traffic information, the distance to the next intersection, travel direction at the next intersection (straight, left turn or right turn.), guidance information associated with the operation of key/button images, the operation unit 34, the voice input unit 36, an operation menu, and/or guidance information associated with keys. It is also possible to display a multiplexed FM broadcast program.

The voice input unit 36 is, for example, a microphone (not shown) for input of necessary information via voice. The voice/sound output unit 37 includes a voice synthesizer and a speaker (not shown) for output of information associated with the detected route, guidance information, and traffic information.

The communication unit 38 includes a beacon receiver for receiving various information such as traffic information transmitted in the form of a radio wave beacon, an optical beacon or the like from transmitters disposed along the road, wherein the information originates from a road traffic information center. The communication unit 38 also includes a FM receiver for receiving FM multiplex broadcast signals transmitted from a FM broadcast station. More specifically, the traffic information may include traffic congestion information, traffic control information, parking lot information, accident information, information indicating availability/congestion of service areas, etc., and the general information may include news, weather reports, etc. Although the beacon receiver and the FM receiver are integrated in the VICS receiver unit here, they may be separately disposed.

The traffic information includes identification of the type of information, mesh numbers identifying meshes, link numbers identifying road links between two points (such as intersections) and identifying travel direction of the road links, and link content information correlated with the respective link numbers. For example, when the traffic information is traffic congestion information, the link information includes information indicating the distance from the starting point of the road link to the point at which congestion will be encountered, information on the degree of congestion, the length of the congestion, and link travel time, i.e. the time required to travel the road link.

The communication unit 38 receives the map data, the statistical data, and the travel history data, from the information center 51 via the network 63. In addition to receiving such data, the communication unit 38 is also capable of receiving traffic information and generating information.

For transmitting such data, the information center 51 includes a server 53, a communication unit 57 and a database (DB) 58, together serving as an information storage unit, wherein the communication unit 57 and the database 58 are connected to the server 53. The server 53 includes a CPU 54, serving as a calculation-and-control unit, and further includes a RAM 55 and a ROM 56. The database 58 contains data similar to the data stored in the data storage unit 16, such as map data, statistical data, travel history data, etc. The information center 51 may provide, in real time, traffic information indicating current traffic conditions originally provided by the road traffic information center, general information, and travel history data collected from a plurality of vehicles (including the user's vehicle and other vehicles).

The front view monitoring apparatus 48 includes one or a combination of a radar, such as a laser radar or a millimeter wave radar, and an ultrasonic sensor, and serves to monitor position of a preceding vehicle relative to the user's vehicle, that is, relative position of a vehicle traveling in the same lane as the user's vehicle or a vehicle traveling in a lane adjacent to the lane in which the user's vehicle is traveling. The front view monitoring apparatus 48 also monitors locations of stops including stop signs and stop lights and obstacles. Furthermore, the front view monitoring apparatus 48 detects the relative speed of the user's vehicle with respect to the speed of a preceding (leading) vehicle, the speed of approach to a stop position (at an intersection of a non-priority road with a priority road, at a railroad crossing, at an intersection with a blinking red signal, etc.), the speed of approach to an obstacle, etc. The front view monitoring apparatus 48 also calculates the distance to a vehicle traveling ahead of the user's car and the time headway.

As for the rearview monitoring camera 49, a CCD camera or a C-MOS camera may be used. The rearview monitoring camera 49 is set such that the vertical view angle, i.e. the vertical angle within which the camera 49 can obtain an image, covers the range from a point substantially immediately below the camera 49 to the vanishing point in the horizontal direction. The rearview monitoring camera 49 obtains images, for example, of painted lines defining a parking space, a vehicle traveling behind the user's vehicle, buildings, etc. The rearview monitoring camera 49 also generates image data from the image and transmits it to the CPU 31. When the CPU 31 receives the image data, the CPU 31 recognizes the painted lines, the following vehicle, and the buildings from the received image data, thereby allowing it to monitor the situation behind the user's vehicle. Images taken by the rearview monitoring camera 49 may also include images of lane lines painted on the road, manholes in the road, traffic signs along the road, traffic signals, etc.

Each headlight 22 includes a high beam lamp and a low beam lamp. When the high beam mode is selected, the high beam lamp is lit and a light beam is emitted in a higher direction. On the other hand, when the low beam mode is selected, the low beam lamp is lit and a light beam is emitted in a lower direction.

The navigation system, the navigation processing unit 17, the CPU 31, the CPU 54, the server 53, etc. may function together as a computer operating in accordance with various programs and data. The data storage unit 16, the RAM 32, the RAM 55, the ROM 33, the ROM 56, the database 58, the flash memory, etc. function as storage media. Instead of the CPU 31 or the CPU 54, a MPU or the like may be used.

The basic operation of the headlight beam control system using the navigation system is described below.

First, when the operation unit 34 is operated by the driver to start the navigation apparatus 14, navigation initialization means (not shown) of the CPU 31 executes a navigation initialization routine. In this navigation initialization routine, the current position detected by the GPS sensor 15 and the direction of the user's vehicle detected by the direction sensor 18 are read, and various types of data are initialized. Matching processing means (not shown) of the CPU 31 execute a matching routine, in which, based on the trail of the current position and correspondence with the shape or the arrangement of road links roads in the vicinity, the current position is identified by detecting the road link on which the vehicle is currently located.

Lane detection means of the CPU 31 executes a lane detection routine to identify the lane in which the user's vehicle is traveling, by capturing the image data of the image taken by the rearview monitoring camera 49, such as an image of painted lane lines, an image of a manhole in the road, an image of a traffic sign on the road, an image of a traffic signal, etc., and image processing of the captured image data to compare the detected image with a painted line, a manhole in the road, a traffic sign on the road, a traffic signal etc. included in the map data.

Alternatively, the lane detection means may detect the lane in which the user's vehicle is traveling based on signals output by the geomagnetic sensor indicating presence of a ferromagnetic object such as a manhole in a lane on the road. In another alternative, the lane in which the user's vehicle is traveling may be determined by detection of the current position of the user's vehicle using the high-precision GPS sensor 15. As required, a combination of the image processing of the image data including painted lines, the detection based on the signals output by the geomagnetic sensor, and detection of the current position of the user's vehicle, may be used to determine the lane in which the user's vehicle is traveling.

Thereafter, basic information acquisition means of the CPU 31 executes a basic information acquisition subroutine, in which the map data is acquired by reading it from the data storage unit 16 or by receiving it from the information center 51 or the like, via the communication unit 38. In the case in which the map data is received from the information center 51 or the like, the basic information acquisition means stores the received map data in the flash memory.

Display processing means of the CPU 31 executes a display subroutine for display of various screens on the display unit 35. For example, road map display means of the display processing means executes a road map displaying routine to form a map screen on the display unit 35, to display a map of the vicinity of the user's vehicle on the map screen, and to display a mark on the map to indicate the current position and the direction of travel of the user's vehicle.

Thus, the driver is guided in accordance with the displayed map and the mark indicating the position and the direction of the user's vehicle.

If the driver inputs a destination by operating the operation unit 34, destination setting means of the CPU 31 executes a destination setting routine to set the destination. The starting point may also be input and set, as required, by operating the operation unit 34. One or more points may be registered in advance, and an arbitrary one of the registered points may be selected and set as the destination. If the driver inputs a search condition via the operation unit 34, search condition setting means of the CPU 31 executes a search condition setting routine to set a search condition.

With the destination and the search condition set in the above-described manner, route searching means of the CPU 31 executes a route searching routine as follows. In addition to the data indicating the current position, the destination, and the search condition, the search data is read from the data storage unit 16. Based on the current position, the destination, and the search data, a route from the starting point (designated by the current position) to the destination is searched for in accordance with the search condition, and route data for the route determined ("identified" or "selected") by the search is output. Note that in this route searching process, a route that has the lowest sum of link costs defined for the respective road links is selected.

In a case in which a road in the determined route has a plurality of lanes and the lanes have been detected, the route searching means searches for proper lanes and generates lane data, e.g. a lane number identifying a lane included in the route data, for guidance with respect to the lanes to be travelled.

Route guidance processing means of the CPU 31 executes a route guidance routine to provide route guidance. In the route guidance routine, the route display processing means, included in the route guidance processing means, executes a route display routine, in which route data for the selected route is read, and the selected route is displayed on the map screen in accordance with the route data. In the case in which the route has been identified in terms of lane units, route guidance is provided for lanes at particular points ("guidance points") such as intersections, and the lane in which the user's vehicle should travel is displayed in an enlarged map of each intersection. Voice/sound output processing means, included in the route guidance processing means, executes a voice/sound outputting routine, as required, to provide route guidance associated with the selected route by output of a voice/sound through the voice/sound output unit 37.

Alternatively, the route searching routine may be executed within the information center 51. In this case, the CPU 31 transmits data indicating the current position, the destination, and the searching condition to the information center 51. When the information center 51 receives the data indicating the current position, the destination, and the searching condition, route searching means of the CPU 54 executes a route searching routine similar to that performed by the CPU 31. That is, the route searching means reads search data from the database 58 and searches for a route from the starting point to the destination based on the current position, the destination, and the search data in accordance with the specified search condition. When a suitable route is found ("selected"), the route searching means outputs route data indicating the selected route. Thereafter, transmission means of the CPU 54 executes a transmission (communication) routine to transmit the route data to the navigation apparatus 14. In the navigation apparatus 14, when the basic information acquisition means receives the route data from the information center 51, the route guidance processing means then provides route guidance in the above-described manner.

When the user's vehicle reaches a point a predetermined length L1 (for example, X meters) ahead of an intersection ("guidance intersection"), the enlarged intersection map displaying means of the guidance processing means executes an enlarged intersection map display routine to display an enlarged intersection map, of a predetermined area, on the map screen in the above-described manner and route guidance is provided on the enlarged intersection map. More specifically, a map of a small area around the intersection, the selected route, landmarks of facilities and the like located at the intersection are displayed in the enlarged intersection map. When the route guidance includes lane units, the lane that should be used is also displayed. As required, the voice/sound output processing means outputs a voice guidance message such as "Turn to the left at a point X meters ahead" through the voice/sound output unit 37.

When the driver drives his/her vehicle at night, if the driver selects the manual high beam mode by operating the mode selection switch 23, manual mode setting means of the CPU 31 executes a manual mode setting routine to send a switching signal, commanding a switch to the manual high beam mode, to the beam switching unit 21. In response to receipt of the switching signal, the beam switching unit 21 turns on the high beam lamp to emit a light beam aimed in the higher direction. As a result, the light beam emitted from the headlight 22 illuminates an area over a wide range.

On the other hand, when the driver selects the manual low beam mode by operating the mode selection switch 23, the manual mode setting means sends, to the beam switching unit 21, a switching signal commanding a switch to the low beam mode. In response to receipt of the switching signal, the beam switching unit 21 turns on the low beam lamp to emit a light beam in the lower direction. In this case, the light beam emitted from the headlight 22 illuminates an area over a smaller range.

When the driver selects the automatic selection mode by operating the mode selection switch 23, headlight beam control means 64, included, within the CPU 31, executes a headlight beam control routine to control the beams emitted from the headlights 22. More specifically, the headlight beam control means 64 determines whether the mode switching condition is satisfied. If the mode switching condition is satisfied, the headlight beam control means 64 generates a switching signal to automatically switch the headlight beam mode between the high beam mode and the low beam mode.

Figure 3:
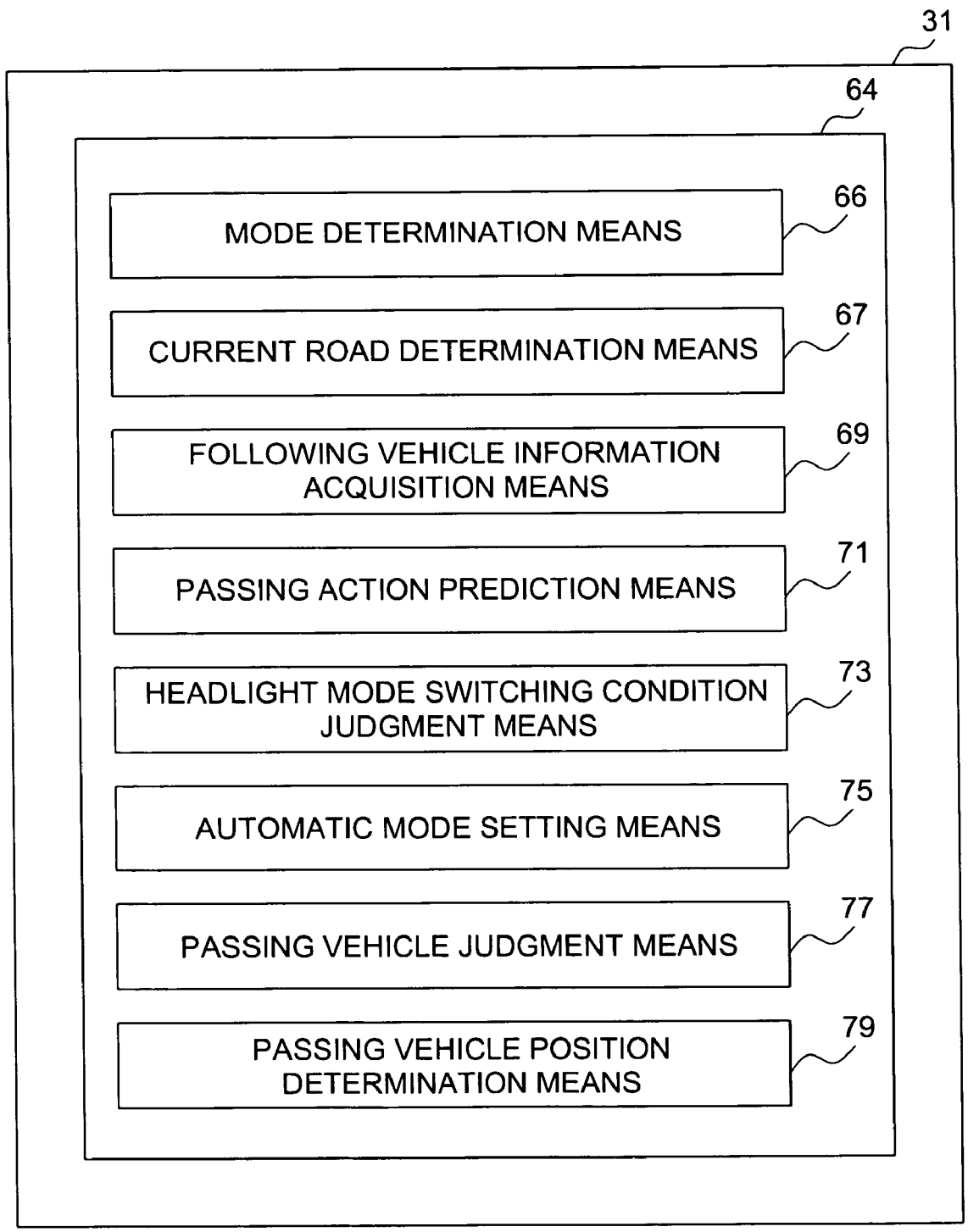
FIG. 3 is a block diagram of CPU 31 of FIG. 1.

The operation of the headlight beam control means 64 is described in detail below, with reference to FIG. 3 which is a flow chart showing the operation of the headlight beam control means 64 according to an embodiment of the present invention.

First, mode determination means 66, within the headlight beam control means 64 executes a mode determination routine to determine the proper headlight beam mode. More specifically, the mode determination means 66 receives the switching signal generated by the automatic mode setting means 75 and determines whether the high beam mode or the low beam mode is specified by the switching signal.

If the high beam mode is specified, current road determination means 67, also within the headlight beam control means, executes a travel road determination routine to detect the current position of the vehicle and then reads road data from the data storage unit 16 (FIG. 1).

Thereafter, the following vehicle (trailing) information acquisition 69 means of the headlight beam control means 64 executes a following vehicle information acquisition routine. More specifically, image data is read from the rearview monitoring camera 49, and an image recognition routine is executed using the acquired image data to determine whether there is a vehicle traveling in the same lane behind the user's vehicle. If a vehicle is detected traveling in the same lane behind the user's vehicle, the distance from the user's vehicle to the following ("trailing" or "passing") vehicle, the running speed of the following vehicle, and the acceleration of the following vehicle are calculated. The acceleration of the following vehicle may be determined by calculating the rate of change in the running speed of the following vehicle.

Subsequently, passing action prediction means 71 of the headlight beam control means executes a passing action prediction routine process to predict an attempt by the following vehicle to pass the user's vehicle (initiation of passing or "passing action"), based on the running speed of the user's vehicle and the following vehicle information. In the present embodiment, it is determined that passing has occurred, for example, when the following vehicle has come along side of the user's vehicle, the position of the front end of the passing vehicle has reached the position of the front end of the user's vehicle, and the passing vehicle has further moved to a position a predetermined length (for example, 1 meter) ahead of the user's vehicle.

When a passing action is predicted, headlight mode switching condition judgment means 73,within the headlight beam control means 64,executes a mode switching condition judgment routine to determine whether the mode switching condition is satisfied, by determining whether the predicted passing action has actually occurred. More specifically, when a passing action is predicted, the headlight mode switching condition judgment means 73 determines the time at which the passing action will be completed, and calculates the time which will elapse until the passing action is completed ("passing time"). The headlight mode switching condition judgment means 73 starts to count the passage of time using a timer and determines whether the passing time has elapsed, that is, whether the passing action is completed. If it is determined that the passing time has elapsed, then it is determined that the mode switching condition is satisfied. If the passing time has elapsed and the mode switching condition is satisfied, the automatic mode setting means of the headlight beam control means executes the automatic mode setting routine to generate a switching signal thereby switching the headlight beam mode from the high beam mode to the low beam mode.

Subsequently, passing vehicle judgment means 77 of the headlight beam control means 64 executes a passing vehicle judgment routine to calculate the distance between the user's vehicle and the vehicle that has passed the user's vehicle ("passing vehicle" now the preceding or leading vehicle) based on the running speed of the user's vehicle and the following vehicle information.

Thereafter, passing vehicle position determination means 79 of the headlight beam control means 64 executes a passing vehicle position determination routine to determine whether the position of the passing vehicle has reached a predetermined distance ahead of the user's vehicle, i.e. to determine whether the distance to the passing vehicle is equal to or greater than a predetermined value, thereby determining whether the position of the passing vehicle has moved out of an area in which the headlight beam mode should be set to the low beam mode (low beam area). If the distance from the passing vehicle has increased beyond the threshold value and the position of the passing vehicle has moved out of the low beam area, the automatic headlight mode setting means 75 generates a switching signal thereby switching the headlight mode from the low beam mode to the high beam mode.

The passing vehicle position judgment means 77 examines the map data to determine whether, in a curve or the like, the passing vehicle has moved to a position at which the passing vehicle cannot be seen from the user's vehicle. If it is determined that the passing vehicle has reached such a position, the automatic mode setting means 75 generates a switching signal to switch the headlight beam mode from the low beam mode to the high beam mode.

Note that the threshold value described above is set such that when the headlight beam mode is switched to the high beam mode, the light beam emitted from the headlight 22 of the user's vehicle does not influence the driving of the passing vehicle.

In the present embodiment, as described above, the passing action is predicted based on the following vehicle information, and the determination is made, based on the predicted passing action, as to whether the mode switching condition is satisfied. If the mode switching condition is satisfied, the headlight beam mode is switched from the high beam mode to the low beam mode.

Therefore, when the passing action occurs, the headlight beam mode can be immediately controlled without a delay, that is, the headlight beam mode can be switched at a correct time without a delay.

The rearview monitoring camera 49 may be any widely used type camera. Thus, the following vehicle information can be acquired without need for installation of an additional special image taking apparatus. This makes it possible to realize the headlight beam control system at low cost.

Furthermore, it is possible to properly control the headlight beam mode regardless of the degree of traffic congestion.

The process will now be described with reference to the flow chart of FIG. 3.

Step S1: A mode determination subroutine is executed.

Step S2: A determination is made as to determine whether the headlight mode is currently set in the high beam mode. If the headlight beam is currently set in the high beam mode, the routine proceeds to step S3, but otherwise the routine is ended.

Step S3: Road data is read.

Step S4: Following vehicle information is acquired.

Step S5: A prediction is made as to whether or not a following vehicle is going to pass the user's vehicle.

Step S6: A determination is made as to whether the following vehicle has passed the user's vehicle. If the passing has been completed, the routine proceeds to step S7, but otherwise the routine returns to step S4.

Step S7: The headlight mode is switched to the low beam mode.

Step S8: The relative location of the passing vehicle is calculated. Step S9: A determination is made as to whether the relative location of the passing vehicle is out of a low beam area. If the location of the passing vehicle has out of the low beam area, the routine proceeds to step S10, but otherwise the routine returns to step S8.

Step S10: The headlight beam mode is switched to the high beam mode, and the routine is ended.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A headlight beam control system comprising:
   an imaging device which captures an image to the rear of the user's vehicle and generates image data from the captured image;
   following vehicle information acquisition means for reading the image data and for acquiring following vehicle information from the image data;
   passing action prediction means for predicting an attempt to pass the user's vehicle by a passing vehicle following the user's vehicle based on the following vehicle information;
   headlight mode switching condition judgment means for judging whether a headlight mode switching condition is satisfied, based on the predicted attempt to pass; and
   automatic headlight mode setting means for switching headlights from a high beam mode to a low beam mode when the headlight mode switching condition is satisfied.

2. The headlight beam control system according to claim 1, wherein the following vehicle information includes at least one of a distance from the user's vehicle to the passing vehicle following the user's vehicle, a speed of the passing vehicle, and an acceleration of the passing vehicle.

3. The headlight beam control system according to claim 1, wherein the automatic headlight mode setting means switches the headlight mode from the low beam mode to the high beam mode when the passing vehicle has passed the user's vehicle and the distance between the passing vehicle and the user's vehicle has become equal to or greater than a predetermined value.

4. A method of controlling a headlight beam, Comprising;
   obtaining an image to the rear of the user's vehicle and generating image data of the obtained image;
   reading the image data and acquiring following vehicle information from the image data;
   predicting an attempt to pass the user's vehicle by a passing vehicle following the user's vehicle, based on the following vehicle information;
   judging whether a headlight mode switching condition is satisfied, based on the predicted attempt to pass; and, responsive to a judgment that the headlight mode switching condition is satisfied, switching headlights from a high beam mode to a low beam mode.

* * * * *